D. M. JOHNSTON.
Cultivator.
No. 226,321.    Patented April 6, 1880.
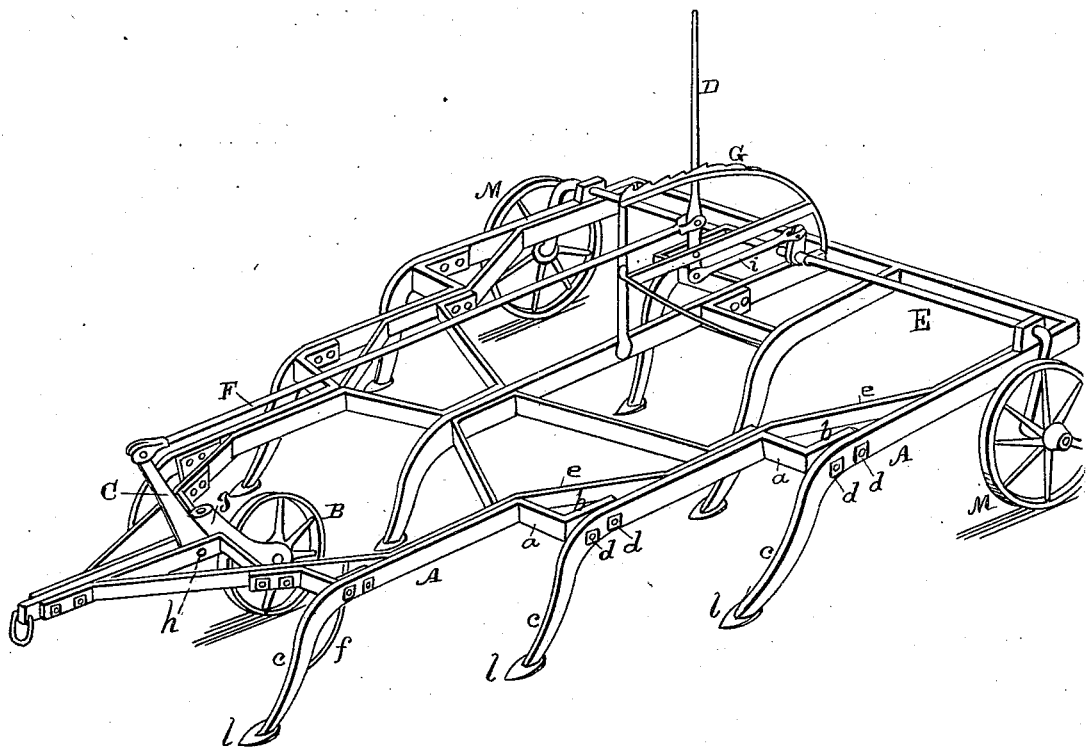
Witnesses
Frank A. Brooks
J. H. Towne
Inventor
David M. Johnston
By Dewey & Co.
Attys

UNITED STATES PATENT OFFICE.

DAVID M. JOHNSTON, OF RED BLUFF, CALIFORNIA.

CULTIVATOR.

SPECIFICATION forming part of Letters Patent No. 226,321, dated April 6, 1880.

Application filed November 21, 1879.

*To all whom it may concern:*

Be it known that I, DAVID M. JOHNSTON, of Red Bluff, county of Tehama, and State of California, have invented an Improved Cultivator; and I hereby declare the following to be a full, clear, and exact description thereof.

My invention relates to certain improvements in cultivators; and my improvements consist in certain details of construction whereby choking and clogging of the teeth when cultivating land that has a heavy stubble or undergrowth are prevented.

The cultivator is constructed of metal and in a peculiar manner, as is more fully described in the accompanying drawing, in which the figure represents a perspective view of my cultivator.

The cultivator A is made of a series of wrought-iron bars or sections, $a$, each having its forward end bent downward, as shown, and its rear end bent twice at right angles or in the form of an elbow, where it is joined to the next section, as shown at $b$, and all of these sections are formed of corresponding shape. Any desired number of these angulated pieces may be joined together, the cultivator being increased in size and capacity with each addition extending on the side. On each of these longitudinal sections $a$ is formed the curved arm or tooth $c$, extending to the ground, the section and tooth being in one piece, and the different sections joined together, as shown, by the bolts $d$ form the frame. Angulated tie-pieces $e$ also join the sections together and stiffen the whole frame, and braces $f$ extend from above to the middle of each tooth or curved arm to furnish them additional support. At the lower end of each tooth or arm is placed the cutting-blade $l$, as shown.

The teeth are all separated from each other and no one is in line with the other; so there is plenty of space between them for stubble to pass through; or if anything gathers on the front of the teeth it will rise and pass over instead of gathering up and pressing beneath the frame, as in the old cultivators.

The front or caster wheel, B, is placed between the two front teeth and back of their points, as shown, so that in going over uneven ground the wheel and front teeth rise and fall at the same time, thus giving an equal depth of cultivation, which those having the front wheel several feet in advance of the frame or teeth do not do.

The front caster-wheel, B, has its rotating bearing $g$ placed on an upwardly-extending arm, $c$, pivoted to the frame, as shown at $h$, by which the front end of the cultivator is regulated as to its height from the ground the same as the rear end is.

On a suitable frame at the rear is placed a lever, D, having a rod, $i$, connecting with the arm on the rear axle, E, this axle being adapted to turn on its bearings and having right-angled ends for the wheels M, as shown. Another rod, F, extends from the lever D to the upper end of the arm C, as shown.

The rods F and $i$ are placed on the lever, one above and one below the pivot of the lever. On the frame carrying the lever is a rack-bar, G.

It will be seen that by throwing the lever back the teeth are raised from the ground, and by allowing it to come forward the teeth and frame are lowered with relation to the wheel, and the rack-bar will hold them at any desired height, so as to regulate the depth of cut of the blades $l$.

The lever operates simultaneously the arm C of the caster-wheel and the rear axle, so that both ends are raised or lowered exactly alike.

This cultivator is very light and at the same time strong and durable.

The cutters may be made of any desired shape.

The frame which I have shown is arranged for nine teeth; but it may be made for any number from five, seven, eleven, &c., by simply adding sections on each side, securing them by means of bolts or nuts, as shown.

The sections are made of wrought-iron and of heavy or light material, according to the land upon which the cultivator is to be used.

Having thus described my invention, what

I claim as new, and desire to secure by Letters Patent, is—

The cultivator A, composed of metal bars or sections $a$, having their forward ends, $c$, bent downward and forward to receive the blades $l$, and their rear ends bent into elbows, as shown, and secured to each other by bolts $d\ d$ and tie-pieces $e$, whereby there is formed a rigid frame the teeth of which are thrown out of line, as set forth.

In witness whereof I have hereunto set my hand.

DAVID M. JOHNSTON.

Witnesses:
HENRY J. JENKINS,
CHAS. A. GARTER.